United States Patent [19]
Coleman et al.

[11] 3,939,474
[45] Feb. 17, 1976

[54] FULLY-COHERENT MULTIPLE FREQUENCY RADAR SYSTEM

[75] Inventors: Donald D. Coleman, Garden Grove; Raymond F. Racine, Orange, both of Calif.

[73] Assignee: Rockwell International Corporation, El Segundo, Calif.

[22] Filed: Sept. 20, 1965

[21] Appl. No.: 488,560

[52] U.S. Cl. .............................. 343/7.7; 343/17.1 R
[51] Int. Cl.² ............................................ G01S 9/42
[58] Field of Search ............... 343/7.7, 17.1, 17.2

[56] References Cited
UNITED STATES PATENTS

| | | | |
|---|---|---|---|
| 2,658,195 | 11/1953 | McConnell | 343/7.7 |
| 3,302,161 | 1/1967 | Ellison | 343/17.1 |

*Primary Examiner*—Malcolm F. Hubler
*Attorney, Agent, or Firm*—H. Fredrick Hamann; Rolf M. Pitts

[57] ABSTRACT

A multiple frequency radar system having improved signal-to-clutter performance. A transmitter responsively coupled to a spacing frequency generator transmits a plurality of mutually coherent frequencies uniformally spaced apart in frequency. An associated non-linear receiver includes a phase detector responsive to the spacing frequency generator for coherent processing of receiver signals provided in response to echoes of the transmitted signal.

10 Claims, 7 Drawing Figures

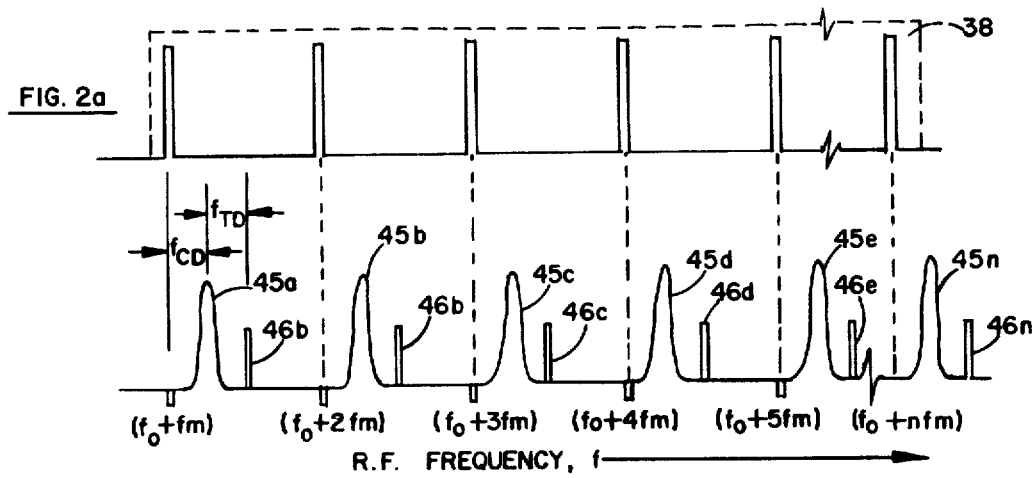
FIG. 2a
FIG. 2b
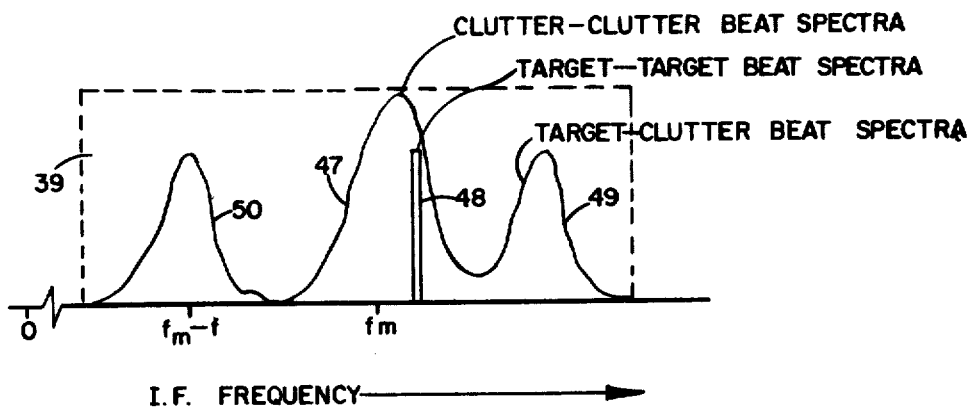
FIG. 4
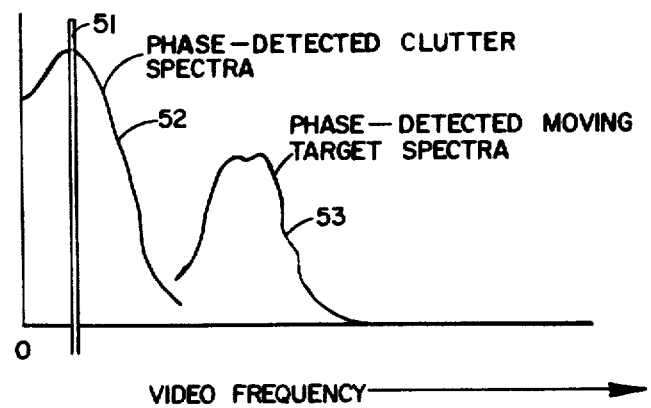
FIG. 5

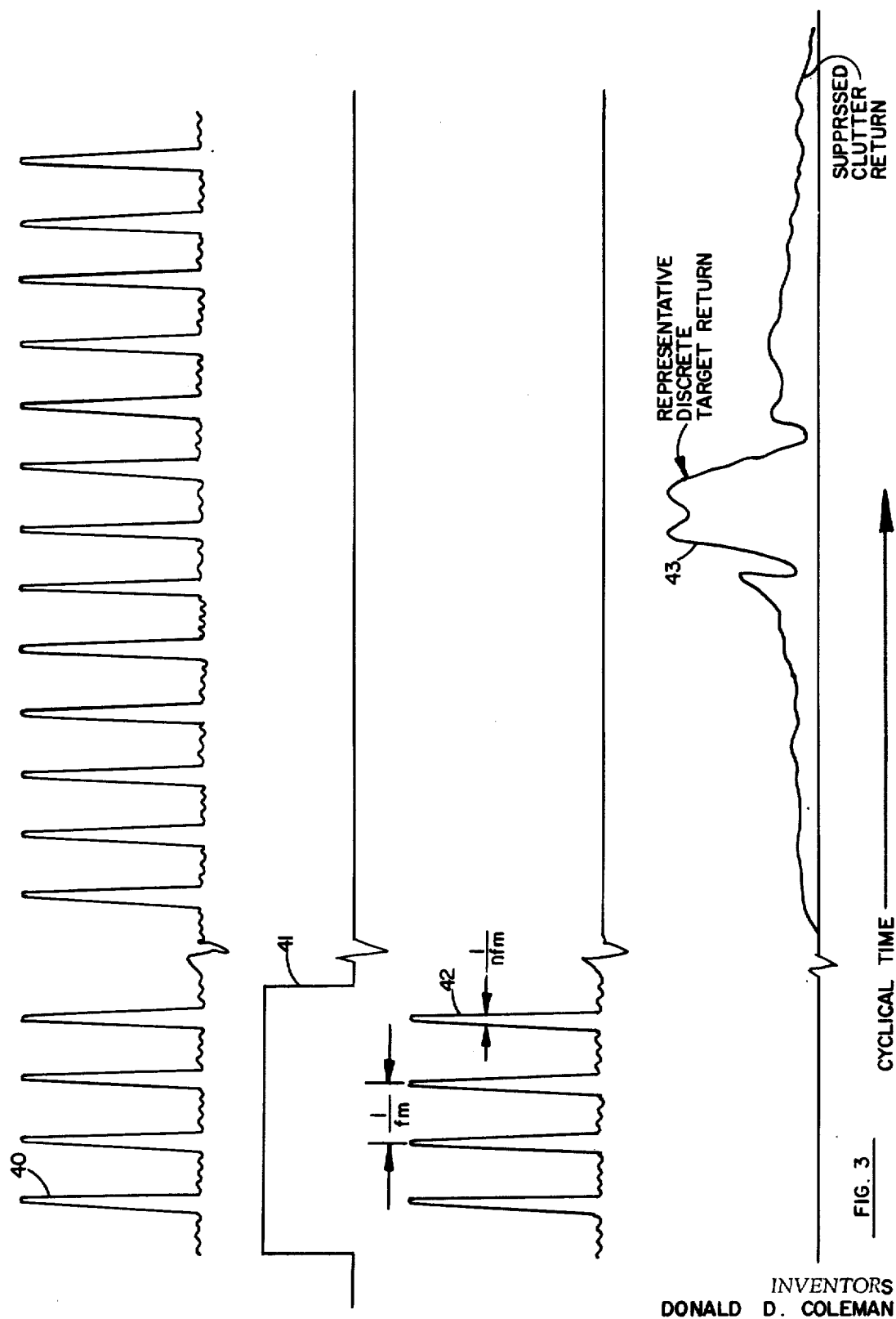

FULLY-COHERENT MULTIPLE FREQUENCY RADAR SYSTEM

BACKGROUND OF THE INVENTION

It has been discovered that the signal-to-clutter ratio for small targets (e.g., targets having a transverse extent less than the antenna beamwidth, and presenting a radial extent less than that represented by the transmitted pulsewidth) may be substantially and significantly enhanced by the pulsed transmission of a plurality of discrete carrier frequencies, representing a plurality of successively increased frequencies, the frequency difference between successive frequencies being not less than that bandwidth corresponding to the reciprocal of the transmitted pulsewidth; and then combining the echoes thereof received from a given target direction and range. A discussion of this technique is more fully discussed in copending U.S. application Ser. No. 430,141 for a Radar System Having Improved Response to Small Targets, filed Feb. 3, 1965, now U.S. Pat. No. 3,500,404, by James O. Anderson et al., assignors to North American Aviation, Inc., assignee of the subject invention, and in copending U.S. application Ser. No. 476,630 for a Multiple Frequency Radar System Having Improved Response to Small Targets, filed Aug. 2, 1965, now U.S. Pat. No. 3,745,578, by Carl R. Barrett, Jr., et al., assignors to North American Aviation, Inc., assignee of the subject invention.

By means of the above-described technique, those components of the received echoes from a small target tend to correlate or cummulatively combine to provide an enhanced signal indicative of the presence of such small target; while the components of the received echoes from a clutter background in the vicinity of the target tend to mutually de-correlate (1) over the duration of the pulsewidth echo for each discrete frequency and (2) as between the received echoes of two discrete frequencies, as to provide an attenuated clutter return, even though the target echo spectra may be contained within the clutter spectra.

While the above-referenced patent applications described several means for implementing such technique, the several embodiments disclosed and illustrated therein employ a noncoherent receiver, whereby the enhancement of the target-to-clutter ratio is less effective. Further, such embodiments do not readily lend themselves to clutter-referenced airborne moving target indication, whereby one discrete target may be identified and distinguished from another by spectral discrimination or differences in doppler shift due to relative velocity differences between them. Such limitation in the noncoherent multiple frequency receiving technique is due to the increased spectral spread in the several spectral components of the received signal, whereby the spectral components for targets of different relative radial velocities (and located in the same general direction and range) tend to overlap in frequency. Accordingly, it is a general object of the subject invention to employ a mutually-coherent multiple-frequency transmission and reception technique for further enhancing the signal-to-noise ratio and target-to-clutter signal ratio in a multiple frequency radar, and which better lends itself to doppler data processing.

In the prior art of doppler radar data processing or moving target indicating (MTI), as applied to a single frequency pulsed radar, several coherent radar techniques have been employed with limited effectiveness, for distinguishing a moving taget relative to a stationary target or a ground clutter return. Such methods have employed means responsive to the relative spectral difference between, or difference in the doppler shifted radar returns for each of, such targets. Where the utilizing radar is mounted on a moving platform such as a high-speed aircraft, the received clutter spectra undergoes a doppler shift in a manner similar to any other target which maintains a relative velocity relative to the radar platform. In other words, both the clutter spectra and moving target spectra will be commonly frequency-translated, or additionally doppler-shifted, as a function of the platform velocity.

In the prior art of airborne moving target indicator (AMTI) systems employing coherent single-frequency radars (in which the receiver comprises a phase detector responsive to the phase of the transmitted single-frequency energy), the frequency of a coherent oscillator (COHO) is shifted in order to compensate for the doppler shift of the clutter spectra (and the target spectra) due to platform (vehicle) velocity and antenna orientation, whereby zero-frequency rejection (i.e., high-pass or doppler) filters may continue to be employed for clutter rejection. Such compensatory frequency shift is accomplished by mixing the output of the COHO with a signal from a tunable oscillator, the frequency of which is controlled by calibrated control source responsive to vehicle speed and antenna orientation. Alternatively, a tunable rejection filter is required to be controlled by the control signal source to reject the doppler-shifted clutter spectra.

In the prior art of noncoherent AMTI systems, advantage is taken of the fact that, in the presence of substantial clutter, the video detected noncoherent receiver signal is clutter referenced, (i.e., the video detected received spectra is folded about a clutter component thereof at zero frequency), regardless of the velocity or changes in motion of the radar platform, whereby a doppler processor having a zero-frequency rejection, or high pass doppler, filter may be employed for clutter rejection. Such prior art single-frequency radar MTI and AMTI Techniques are reviewed more fully in U.S. patent application Ser. No. 391,073 for an AMTI Radar System, filed Aug. 18, 1964, by Forest J. Dynan et al., assignors to North American Aviation, Inc., assignee of the subject invention, and in the text of Chapter 4 of *Radar Systems* by Skolnik, published by McGraw-Hill (1962).

A disadvantage of the prior art clutter-referenced doppler techniques is that the unipolar video amplitude detection employed provides an output signal which reflects the receiver-gain compression characteristics. Such gain compression, achieved by means of logarithmic receivers or AGC controlled receivers, is conventionally used to overcome the effects of range and the like upon the signal strength of the received signal. However, any compression in the receiver gain characteristics similarly compresses the prior art clutter-referenced doppler video modulation and results in a reduced doppler detection sensitivety.

Recapitulating, a single-frequency noncoherent radar system may directly provide a clutter-referenced video-detected signal for AMTI purposes, while a single-frequency coherent radar system requires the addition of radar-platform velocity-compensation in order to provide a clutter-referenced signal conveniently adapted for AMTI processing. However, such noncoherent technique does not provide the signal-to-noise advantages of coherent data receivers. Also, neither of such single frequency radar techniques provides the enhancement of discrete target-to-clutter ratio provided by multiple frequency radar techniques. Further, such noncoherent clutter-reference signalling technique does not lend itself to use with multiple-frequency radar systems for the reason that the increased spread of each of the resultant beat-frequency clutter and target components of the doppler-shifted spectra tends to result in an overlapping of such spectra as to make difficult the spectral discrimination of a selected moving target from other moving targets or ground clutter proximate thereto and between which a relative radial velocity exists. Moreover, prior art unipolar video amplitude detection of the moving target IF signal results in reduced doppler video output sensitivity due to the gain compression characteristics of the IF amplifier stage preceding the video stage.

By means of the concept of the subject invention, the above-described limitations of the prior art are avoided, and a mutually-coherent multiple frequency radar having a coherent receiver is utilized to provide a substantially clutter-referenced signal inherently adapted for AMTI processing without the necessity of radar platform-motion compensation means, and having an enhanced signal-to-clutter ratio and extended dynamic signal range performance.

In a preferred embodiment of the invention, there is provided multiple radar frequency transmission means responsively coupled to a single modulating frequency source for providing a plurality of concomitant, mutually-coherent transmittted frequencies, uniformly spaced apart in frequency by the amount of such modulating frequency. The source of the modulating frequency, which frequency is preferrably greater than that represented by the reciprocal of the transmitted pulsewidth of the transmitted energy, is also operatively connected as a time coherent, or phase, reference input to a phase detector of a receiver responsive to the beat frequencies between the received echoes of the transmitted energy.

In normal operation of the above-described arrangement, echoes of the transmitted plurality of uniformly frequency-spaced, mutually-coherent frequencies are received and nonlinearly detected, or beat together, to provide a beat frequency spectra. Such beat frequency spectra, when band pass-limited about a center frequency corresponding to the modulating frequency and then phase-detected relative to such modulating frequency, provides a suppressed clutter beat frequency spectrum and an enhanced clutter-target beat frequency spectrum, due to the clutter decorrelation effect manifested by the detected beat-frequency effect among the received echoes of the mutually coherent transmitted frequencies. Further, although the target-to-clutter beat frequency spectrum for each target is displaced in frequency by the amount of the relative doppler shift or difference between the clutter and such target occurring for the transmitted RF frequencies, yet the displacement of the phase-detected clutter spectrum has been discovered not to be similarly shifted by a doppler frequency corresponding to that expected to be associated with the effect of the radar platform velocity upon the transmitted frequencies. Instead, a first component or centroid of the phase-detected clutter spectrum (occurring due to the beat frequencies difference between the component frequencies of the multiple-frequency clutter return and corresponding to the uniform spacing frequency) occurs at a very low frequency approacing d-c or zero frequency, manifesting the effect of the ratio of the spacing frequency to the transmitted frequencies upon the observed doppler shift. Accordingly, such coherently-detected beat frequency signals may be doppler-processed in the manner of clutter-referenced AMTI signals by means of doppler-bandpass or low-frequency rejection means, and without the necessity of the platform motion compensation means associated with prior-art coherent AMTI receiver apparatus. Moreover, because a coherent reference frequency is utilized to phase-detect the IF receiver signals, the resultant video output is therefore less sensitive to the effects of IF receiver gain-compression, the video output being primarily sensitive to the phase difference between the coherent reference and the beat frequencies of the multiple frequency returns.

In other words, the invention provides the advantages of a coherent radar system and of noncoherent AMTI processing, without the normally associated disadvantages of each, by employing a fully-coherent multiple frequency radar system which further provides signal-to-clutter amplitude enhancement, whereby the target signal spectra may be distinguished from the skirt of the clutter spectra at lower target minimum velocities. Accordingly, it is an object of the invention to provide an improved multiple-frequency radar system.

It is another object of the invention to provide a fully coherent multiple frequency radar system.

It is yet another object of the invention to provide a coherent radar system having an enhanced target-to-clutter and signal-to-noise response.

It is still another object of the invention to provide a coherent radar system for a moving platform and providing a substantially clutter-referenced, coherently detected receiver signal without the necessity of radar platform motion compensating means.

These and other objects of the invention will become apparent from the following description, taken together with the accompanying drawings in which:

FIGS. 2a and 2b are a family of spectral diagrams illustrating the spectrum transmitted by the system of FIG. 1 and the associated received spectrum in response to a detected target moving relative to a clutter background.

FIG. 3 is a family of time histories of the transmitted waveform provided by the mutually-coherent, multiple-frequency transmitter of FIG. 1.

FIG. 4 is a spectral diagram of the received spectrum of FIG. 2b after having been nonlinearly detected and bandpass limited, the bandpass center frequency being equal to the transmitter spacing frequency;

FIG. 5 is a spectral diagram of the detected and bandpass limited receiver spectra of FIG. 3 after having been phase-detected relative to the transmitter spacing frequency, and demonstrating the substantially clutter-referenced resultant moving-target spectrum.

In the FIGURES, like reference characters refer to like parts.

Figure 1:
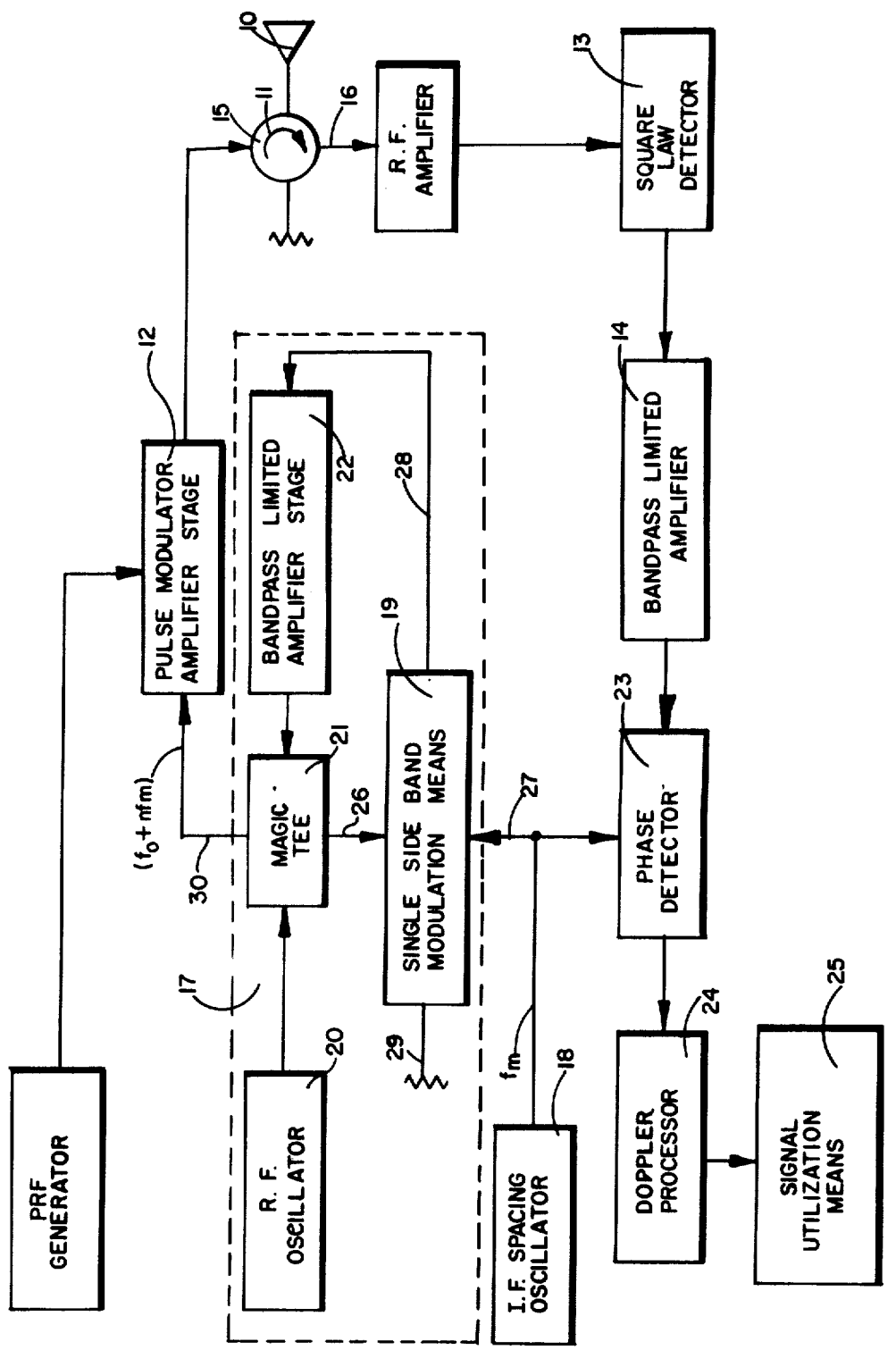
FIG. 1 is a block diagram of a system embodying the concept of the invention.

Referring now to FIG. 1, there is illustrated in block diagram form a radar system embodying the concept of the invention. There is provided an antenna 10 in cooperation with transmit-receive means 11, such as a ferrite circulator. A source of pulsed radio frequency energy comprising a pulse modulator 12, is coupled to a transmit terminal 15 of circulator 11; and an intermediate frequency receiver comprises a nonlinear or square-law detector 13 having an output coupled to the input of a tuned intermediate frequency amplifier 14, and further having an input coupled to a receiver terminal 16 of circulator 11. The construction and arrangement of elements 10, 11, 12, 13 and 14 are well understood in the art. Therefore, these elements are shown in FIG. 1 in block form only for convenience in exposition.

There is further provided a multiple frequency generator or closedloop radio frequency single side band modulation means 17 in cooperation with a spacing frequency oscillator 18 for generating a concomitant plurality of mutually-coherent frequencies uniformly spaced apart in frequency by the frequency of oscillator 18. Such spacing frequency, provided by oscillator 18, is selected as being less than that represented by the reciprocal of the system pulsewidth provided by modulator 12 and represents the center frequency of IF receiver-amplifier 14, for reasons which will be more fully explained hereinafter.

Closed loop single side band modulation means 17 comprises a radio frequency single side band modulator 19 having one input 26 responsively connected to a source 20 of radio frequency energy, and further having a second input 27 coupled to the output of modulating frequency source 18, for providing one of an upper and lower side band signal at a first output 28 thereof, and may provide a corresponding second side band signal at a second output 29. Magic tee 21, or like signal combining means, is provided for combining one of the single side band output signals as a feedback signal with the radio frequency input 26 to modulator 19, a second output terminal 30 of magic tee 21 extracting such single side band signal as a radio frequency input to pulse modulator 12. Alternatively, the other of the single side band output signals may be fed to pulse modulator 12. Also included in the feedback arrangement of modulator 19 is a bandpass limited amplifier stage 22 for the purpose of limiting the spectral content of the modulation envelopes of the single side band outputs of moudlator 19 to a selected number ($n$) of frequencies, spaced apart by the spacing frequency, $f_m$, provided by oscillator 18. The construction and arrangement of single side band modulation means 19 is known in the art, an exemplary embodiment thereof being more fully described for example in the above noted U.S. application Ser. No. 476,630 filed Aug. 2, 1965, now U.S. Pat. No. 3,745,578, by Carl R. Barrett, Jr., et al.

In normal operation of the closed loop arrangement of single side band modulator of FIG. 1, only one set of side bands is used to provide a multiple frequency coherent transmission source, (the other set may be terminated in a load impedance), as may be more fully appreciated from FIGS. 2a and 2b.

Referring to FIGS. 2a and 2b, there is illustrated a family of spectral diagrams, illustrating the spectrum transmitted by the system of FIG. 1, and the associated received spectrum in response to a detected target moving radially relative to a clutter background.

The mixing of the modulation frequency $f_m$ (from spacing oscillator 18 of FIG. 1) with the radio frequency $f_o$ (from RF source 20 of FIG. 1) produces a first upper side band component $(f_o + f_m)$, at output terminal 28 (in FIG. 1) and a first lower side band component, $(f_o - f_m)$ at output terminals 29 (in FIG. 1). The feedback of one of the single side band outputs to the RF input of modulation means 19 produces a subsequent modulation of such first component signal by the modulating frequency from spacing oscillator 18, resulting in an additional component frequency in the single side band output, such additional component differing in frequency from the first component by the amount of the spacing frequency, $f_m$. The result of such feedback cooperation is a plurality of concomitant discrete frequencies, uniformly spaced apart in frequency by the spacing frequency, $f_m$, the number, $n$, of such component frequencies of the single side band output being limited by the bandwidth $(n - 1)$ of the feedback amplifier stage 22 (of FIG. 1), which bandwidth is indicated as curve 38 in FIG. 2a.

For example, where the upper side band is employed as the feedback signal, the first component output frequency is $(f_o + f_m)$. The feedback of such component frequency, and the modulation thereof by spacing frequency $f_m$, produces a second component frequency $(f_o + 2f_m)$. The feedback and modulation of such successive frequency produces successively higher frequencies, all spaced apart in frequency by the modulating frequency, $f_m$. A bandpass limited feedback amplifier having a bandwidth of at least $(n - 1)f_m$, the lower bandpass limit of which includes the first or lowest component side band frequency, $(f_o + f_m)$, as represented by curve 38 in FIG. 2a, is thus seen to limit the number of concomitant discrete frequencies so generated to the number n. Moreover, because the plurality of discrete input radio frequencies to modulator 19 are synchronously modulated by a single common modulating signal of frequency $f_m$, the resulting concomitant discrete output frequencies are mutually coherent or cyclically cophasal, as shown more particularly in FIG. 3.

Referring to FIG. 3, there is illustrated a family of time histories of the system of FIG. 1. Curve 40 is a representative history of the output on line 30 of closed loop multiple frequency generator 17, which is fed as an input to the pulse modulator 12 of FIG. 1; curve 41 is representative time history of the pulsewidth or pulse modulation envelope cyclically generated by pulse modulator 12 at the system pulse repetition rate; curve 42 represents the transmitted waveform or pulsewidth modulated output from modulator 12 which is transmitted by antenna 10 (of FIG. 1); and curve 43 represents the time history of a representative video detected response of receiver 14 to a discrete target in the presence of clutter.

Curve 40 indicates the periodic cophasal relationship or periodic cumulative amplitude effect of the mutually-coherent, multiple frequency output generated by generator 17, while curve 42 indicates the modulation of curve 40 by curve 41. The envelope of the transmitted multiple frequency energy shown in curve 42 of FIG. 3, is seen to differ from that of a pulsewidth modulated single frequency source in that the envelope of curve 42 substantially represents a pulsewidth train, or succession, of extremely short impulses, rather than a fixed magnitude envelope (such as, for example, curve 41 in FIG. 3). Such periodic impulses occur within the pulsewidth interval at a repetition interval equal to the reciprocal of the spacing frequency, $f_m$, due to the mutual coherence of the multiple frequencies transmitted.

Figure 6:
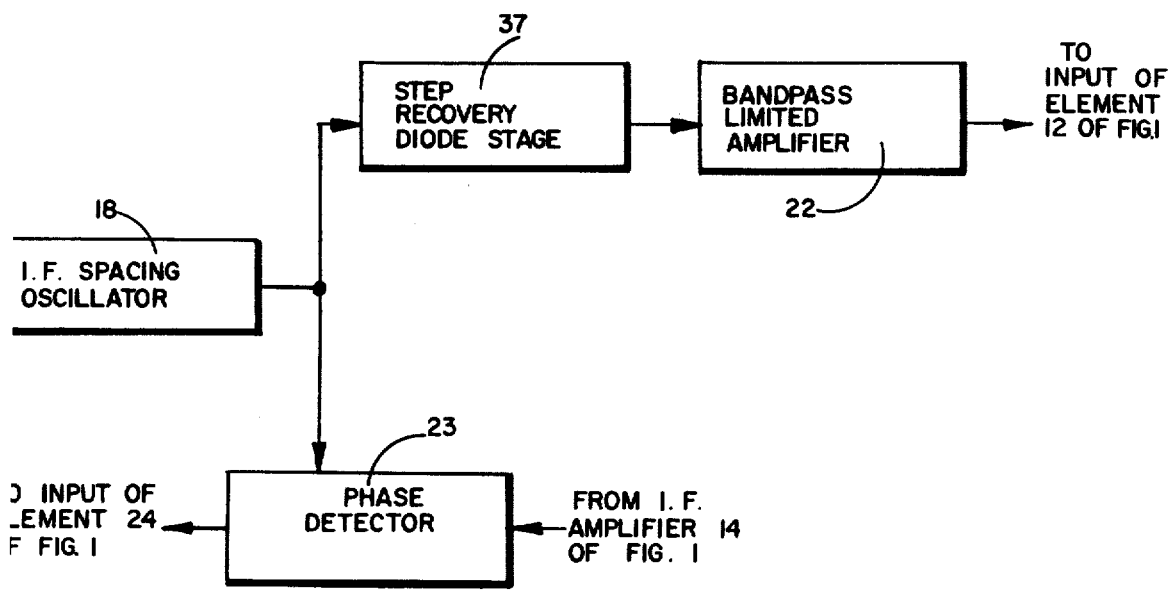
FIG. 6 is an alternate embodiment of the mutually-coherent multiple-frequency generator of FIG. 1.

Although the mutual-coherent multiple frequency means 17 of FIG. 1 has been described and illustrated as employing a single side-band modulator in closed loop cooperation with spacing oscillator 18, an open loop arrangement may be employed, as shown in FIG. 6.

Referring to FIG. 6, there is illustrated in block diagram form an alternative arrangement of the source 17 of mutually coherent multiple transmitter frequencies. There is provided a step recovery diode stage 37 responsively coupled to spacing oscillator 18 for generating a plurality of RF harmonic frequencies. Because such frequencies are harmonics of the output of oscillator 18, such frequencies are, therefore, mutually coherent. The output of the step recovery diode stage 37 may then be suitably bandpass limited as desired by a bandpass-limited amplifier 22 prior to being applied as an input to RF pulse modulator 12 of FIG. 1.

Referring again to FIG. 2b, the received echoes of the transmitted multiple frequencies, reflected from a radar target and received by antenna 10 and applied to the input of first detector 13 (of FIG. 1), are represented by the spectral diagram of FIG. 2b. The spectral lines of the received RF energy are seen to be illustrated generally by two groups of envelopes. The first group represents the return due to a substantial amount of ground clutter, each member of the group having a center frequency or main cusp 45 corresponding to an associated one of the transmitted spectral lines of FIG. 2a and shifted in frequency therefrom by an amount ($f_{CD}$) corresponding to the doppler shift provided by the radar platform motion (vehicle speed) relative to the clutter-producing point scatterers of the terrain. A cusp of frequency spread occurs about the clutter spectral lines due to the variation of doppler shift contributed by variations in direction of all the terrestial point scatterers within the beamwidth of the antenna.

Also shown in FIG. 2b is a group of lesser and narrower envelopes 46 representing the lesser energy return from a small moving target occurring within the beamwidth of the antenna 10 of FIG. 1, each envelope having a center spectral line corresponding to the center of an associated cusp of the clutter envelope, but shifted in frequency therefrom by an amount ($f_{TD}$) corresponding to the doppler-shift occurring due to the motion of the target relative to the ground. The spectral elements 46 comprising the moving target spectral envelope are shown as lines, and not cusps, because the narrow angular extent of the small moving target relative to that of the antenna beamwidth limits the spectral response resulting from the target echo, relative to that provided by the clutter return from the ground.

The received echoes of the transmitted multiple frequencies, illustrated in FIG. 2b, are beat together or mutually mixed in nonlinear detector 13 (FIG. 1), resulting in a plurality of beat frequencies at integer multiples of the uniform spacing frequency, $f_m$, the corresponding beat frequency spectral content and representative time domain history of which are respectively shown in FIG. 2b and as curve 43 in FIG. 3. Receiver-mixer 13 may be comprised of a diode mixer or square-law detector, comprising a terminated straight wave-guide section, across the narrow dimension of which a diode is inserted, and having a probe for extracting the detected mixed signals for further bandpass-limited processing by IF receiver 14. The construction and arrangement of such mixers or detectors are well known in the art, as indicated, for example at page 257 of the text, "The Spectral Energy Domain," by Davenport and Root, and published by McGraw-Hill (1958); and at pages 385–387 of "Introduction to Radar Systems" by Skolnik, published by McGraw-Hill (1963).

Referring again to FIG. 1, the output of IF amplifier 14 is phase-detected by means of a phase-detector 23 employing the output of spacing oscillator 18 as a phase reference. The spacing frequency $f_m$ of oscillator 18, representing the spacing frequency between the plurality of transmitted frequencies, also therefore corresponds to a beat frequency obtained by the nonlinear detection of the received echoes of the transmitted energy. Accordingly, IF amplifier 14 is designed to have a center frequency equal to a selected one of the beat frequencies, corresponding to an integer multiple (preferrably unity) of the spacing frequency $f_m$, and has a bandwidth preferrably no larger than that represented by the reciprocal of the transmitted pulsewidth, indicated by curve 39 of FIG. 4, so as to optimize the signal-to-noise response thereof.

Because the echoes produced by a small or discrete target will tend to preserve the coherence between the transmitted multiple frequencies, like beat frequencies between such discrete transmitted frequencies, produced in first detector 13 (of FIG. 1) will tend to be coherent, resulting in a cumulative amplitude envelope. On the other hand, return echoes received from a clutter patch of extended radial and angular extent will demonstrate a somewhat random appearing phase relationship between returns occurring of like frequency within a pulsewidth interval, and as between different ones of the transmitted frequencies, whereby the amplitude envelope of the beat frequency components due to the ground clutter tend to be suppressed or mutually cancelling. The input to phase-detector 23 from amplifier 14 is seen from FIG. 4 to be comprised of four spectral components contained within that bandwidth 39 having a center frequency, $f_m$: a first spectral distribution or cusp (curve 47 in FIG. 4), provided by the beating of the doppler-shifted clutter frequencies against each other and corresponding to cusps 45 in FIG. 2b; a narrow spectral line (curve 48 in FIG. 4) provided by the beat frequency or frequency difference between the doppler-shifted discrete target signals (shown as lines 46 in FIG. 2b); and two spectral distributions (curves 49 and 50 in FIG. 4) corresponding to the upper and lower sidebands provided by the beating of each clutter cusp 45 and an adjacent moving-target spectral line 46 of FIG. 2b.

The associated doppler-shift effect upon such beat frequency spectral distributions relative to the spacing frequency $f_m$ (employed as a phase reference by phase detector 23), is much less than that experienced by the received echoes of the discrete frequencies transmitted relative to such discrete frequencies. The reason for this is that the resultant beat frequency manifests only the difference between the doppler-shifted discrete frequencies.

for example, for a radar platform, or vehicle, having a relative velocity $v_r$, the doppler shift $f_d$ for a selected one of the transmitted discrete frequencies may be determined (from Equation 1.3 at page 3 of "Introduction to Radar Systems" by Skolnik, published by McGraw-Hill, 1963), as follows:

$$f_d = \frac{2v_r}{\lambda} \qquad (1)$$

where
λ = wavelength of such selected one of the discrete frequencies transmitted Hence, the beat frequency or frequency difference ($f_2' - f_1'$) between the respective doppler-shifted echoes of each of two transmitted frequencies, $f_1$ and $f_2$, spaced apart in frequency by the spacing frequency $f_m$, would not be the spacing frequency, $f_m$, itself:

$$(f_2' - f_1') = (f_2 + f_{d_2}) - (f_1 + f_{d_1}) \quad (2)$$

Where:

$f_{d_1}$ = the doppler shift associated with the transmitted frequency $f_1$.

and $f_{d_2}$ = the doppler shift associated with the transmitted frequency $f_2$.

$\lambda_1$ = the wavelength associated with transmitted frequency $f_1$.

$\lambda_2$ = the wavelength associated with transmitted frequency $f_2$.

Substituting ($f_1 + f_m$) for $f_2$, and employing the relationship of Equation (1) for $f_d$ and $f_d$ :

$$(f_2' - f_1') = \left(f_1 + f_m + \frac{2v_r}{\lambda_2}\right) - \left(f_1 + \frac{2v_r}{\lambda_1}\right) \quad (3)$$

Rearranging the right hand member of Equation (3):

$$(f_2' - f_1') = f_m + 2v_r \left(\frac{1}{\lambda_2} - \frac{1}{\lambda_1}\right) \quad (4)$$

Accordingly, the centroid 51 of the spectral output of receiver amplifier 14 of FIG. 1, in response to a doppler-shifted clutter return (for example) will be frequency-shifted only slightly relative to the amplifier center frequency (which corresponds to the spacing frequency $f_m$), as seen from curve 47 of FIG. 4. Such doppler effect is very much less than the doppler shifts associated with each of the discrete transmitted frequencies, and represents the difference ($f_{d_2} - f_{d_1}$) between such doppler shifts. In a practical device such effect can be made negligibly small. For example, for a spacing frequency of 10mc between discrete transmitter frequencies in the X-band region, and a relative clutter velocity of 200 knots, the doppler effect upon the clutter-clutter beat frequency component within the illustrated IF amplifier bandpass 39 (in FIG. 4) will be only 6 cps spread of the clutter spectrum. A similar effect occurs for the target-target beat frequency spectra, shown as curve 48 in FIG. 4.

However, the beat frequency spectra resulting from the mixing of the moving-target spectra and the clutter spectra will yet be that doppler difference frequency indicative of the velocity of the moving target relative to the clutter patch. Now, because the centroid frequency 51 of the clutter patch beat-frequency spectra is substantially identical with the spacing frequency $f_m$ for practical transmitted frequencies and ususl aircraft velocities, phase-detection of the output of amplifier 14 by phase-detector 23 (in FIG. 1), using the spacing frequency source 18 as a phase reference, results in a substantially clutter-referenced signal, as shown in FIG. 5. In other words, the phase-detection of the signal spectra of FIG. 4, relative to the spacing frequency $f_m$, folds the spectra about such reference frequency, which reference is translated to zero frequency in FIG. 5. The centroid 51 of the phase detected clutter spectra (curve 52 in FIG. 5) is substantially invariant with changes in vehicle velocity, while the phase-detected target-to-clutter spectra (curve 54 in FIG. 5) is indicative of the sensed motion of the target relative to the clutter background.

Because the output of phase detector 23 (in FIG. 1) is substantially clutter-referenced, conventional doppler processing, such as selected bandpass filtering, may be directly utilized by element 24 to reject that low frequency spectrum representing the clutter return. In other words, because the frequency shift of the clutter signal component in the output of phase-detector 23, associated with changes in the radar platform velocity, is so inconsequential, no vehicle-velocity frequency-compensation means need be employed in the system of FIG. 1.

Further, because coherent data processing, or phase-detection, is employed, the spectral distributions of the clutter-clutter beat frequencies and of the target-clutter is not further spread so as to more readily overlap, which overlap would make more difficult the filtering or spectral distinction of the moving target signal from the clutter return. In other words, to attempt to simply video-detect the output of amplifier 14 (in FIG. 1) would result in a clutter-reference signal for which a further frequency-beating of the clutter and moving target spectral cusps would arise, due to the incidental nonlinearities in a video detector, resulting in an undesirably wider spectral distribution of the clutter and moving target signal components and in consequent overlapping of the two spectral components. Moreover, because phase-detection is empolyed, the video moving target signal component is less subject to the gain compression effects of the IF receiver amplifier 14.

The doppler data processing element 24 of FIG. 1 may combine the functions of range-coherent integration and doppler filtering by employing the structure described in copending U.S. application Ser. No. 391,073 filed Aug. 18, 1964, by Dynan et al., assignors to North American Aviation, Inc. assignee of the subject invention.

Because of the amplitude enhancement of the discrete target signal relative to the clutter return by means of the device of the invention, a moving target signal target located in or near the skirt of the clutter spectra (in FIG. 5) may be more readily distinguished from the clutter spectra. In other words, moving targets may be distinguished at lower target velocities.

Accordingly, there has been described a new and useful fully coherent multiple frequency radar system having improved signal-to-clutter characteristics, inherent platform velocity compensation, and improved sensitivety over a wide dynamic signal range as to provide extended airborne moving target indication capability.

Although the device has been described in terms of a radar system for transmitting and receiving signals having a plurality of radio frequencies, the concept of the invention is not so limited, being equally applicable to energy transmission systems employing other forms of energy, such as for example sonar systems. Further, although the concept of the invention has been described as having utility to airborne systems, it is clearly understood to refer to any vehicle or moving platform, such as for example a submerged submarine, moving with respect to a sonar clutter patch such as the seabottom and mounting a sonar system utilizing the concept of the invention.

Although the invention has been described and illustrated in detail it is to be clearly understood that the same is by way of illustration and example only and is not to be taken by way of limitation, the spirit and scope of this invention being limited only by the terms of the appended claims.

We claim:

1. The combination comprising
   a system for transmitting a plurality of mutually coherent frequencies uniformly spaced apart in frequency by a preselected spacing frequency and for receiving echoes of said transmitted frequencies, and having a spacing frequency oscillator for generating said spacing frequency; and
   coherent signal processing means responsive to said oscillator of said system and the beat frequencies between received echoes for providing a phase-detected receiver signal.

2. The device of claim 1 in which there is further provided doppler filter means responsively coupled to the output of said coherent processing means for suppressing that spectral content thereof which is indicative of the clutter return in a substantially clutter-referenced signal.

3. The device of claim 1 in which there is further provided moving target indicating means responsive to said coherent processing means comprising high frequency bandpass means the upper frequency limit of the bandpass of which does not exceed one-half the pulse repetition frequency of a sampled-data system utilizing said device.

4. The device of claim 1 in which said signal processing means comprises
   frequency mixing means responsive to said received echoes for providing an intermediate frequency signal indicative of the frequency differences therebetween;
   intermediate frequency means having a center frequency corresponding to an integer multiple of said spacing frequency and a bandpass limited to the reciprocal of the transmitted pulsewidth for amplifying a selected one of said beat frequencies; and
   a phase-sensitive detector having a first and second input respectively coupled to the output of a respective one of said spacing oscillator and intermediate frequency means.

5. A pulsed energy system including a pulse modulator, and comprising
   a source of a modulating frequency at least as high as that represented by the reciprocal of the pulsewidth provided by said pulsed energy system;
   multiple frequency generating means responsive to said modulating frequency for generating at least two mutually coherent, concomitant and discrete frequencies, spaced apart in frequency by said modulating frequency, and being modulated by said pulse modulator for transmission by said pulsed energy system; and
   phase sensitive detection means having a first input responsive to selected ones of the beat frequencies between received echoes of signals transmitted by said system and further having a reference input responsive to said source of a modulating frequency for providing a phase-detected output signal.

6. A pulsed radar system including a pulse modulator and comprising
   a source of a modulating frequency at least as high as that represented by the reciprocal of the pulsewidth provided by said pulsed radar system;
   closed loop radio frequency single side band modulating means responsive to said modulating frequency for generating a side band signal representing at least two mutually coherent, concomitant and discrete frequencies, uniformly spaced apart in frequency by said modulating frequency, said side band signal being fed to said pulse modulator for transmission by said pulsed radar system; and
   phase sensitive detection means having a first input responsive to selected ones of the beat frequencies between received echoes of said transmitted signals and further having a reference input responsive to said modulating frequency for providing a phase-detected output signal.

7. In a radar system having enhanced small target response and including means having an input for concomitantly transmitting radio frequency energy at a plurality of mutually-coherent discrete frequencies and receiving means responsive to received echoes of said energy reflected from a target, the combination comprising
   generating means for generating a reference modulating frequency at least as high as the reciprocal of the pulsewidth of said pulsed energy and representing an integer submultiple of a preselected intermediate frequency;
   radio frequency single side band modulator mixing means having an input coupled to an output of said generating means and providing a side band signal;
   magic tee radio frequency signal combining means interposed at said output of said single side band modulator for combining said side band signal as a feedback signal with said output of said generating means and for extracting said side band signal for transmission purposes, said extracted signal being fed to said input of said transmitting means; and
   coherent intermediate frequency receiver means responsive to said modulating frequency and selected ones of the beat frequencies between said received echoes providing a receiver output signal.

8. In a pulsed radar system having enhanced small target response and including means having an input for concomitantly transmitting pulsed energy at a plurality of discrete frequencies uniformly spaced apart in frequency the combination comprising
   generating means for generating a reference modulating frequency at least as large as the reciprocal of the pulsewidth of said pulsed energy and representing an integer submultiple of a preselected intermediate frequency;
   radio frequency single side band modulator mixing means having an input coupled to an output of said generating means and providing an upper and a lower side band signal;
   magic-tee radio frequency signal combining means interposed at said input of said mixing means for combining one of said side band signals as a feedback signal with the output of said generating means and for extracting said side band signal for transmission purposes, said extracted signal being fed to said input of said transmitting means
   non-linear detection means responsive to received echoes of said transmitted frequencies for providing signals at the beat frequency differences therebetween;

bandpass limited means responsively coupled to said detection means and having a center frequency equal to an integer multiple of said modulating frequency; and a phase-sensitive detector having a first and second input, each responsively coupled to the output of a exclusive one of said generating means and said bandpass limited means.

9. In a pulsed radar system having enhanced small target response and including means having an input for concomitantly transmitting pulsed energy at a plurality of mutually-coherent frequencies uniformly spaced apart in frequency, and receiving means responsive to received echoes of said pulsed energy reflected from a target, the combination comprising a source of a spacing frequency at least as high as the reciprocal of the pulsewidth of said pulsed energy and representing a preselected intermediate frequency;

radio frequency single side band modulation means coupled to said source and providing a single side band signal;

bandpass limited means responsive to said side band signal for providing a feedback signal;

radio frequency signal combining means interposed between said source and said modulation means for combining said feedback signal with an input of said source and for extracting said feedback signal for transmission purposes, said extracted signal being fed to said input of said transmitting means; and coherent intermediate frequency receiver means including phase sensitive detection means responsive to said spacing frequency and to selected ones of the beat frequencies between said received echoes for providing a coherently-detected receiver signal.

10. In a moving target indicating system for a platform moving relative to a clutter patch, means for enhancing the response of said system to a target moving relative to both said clutter patch and said platform, and having enhanced small target response and including means having a spacing frequency input for concomitantly transmitting pulsed energy at a plurality of mutually coherent frequency uniformly spaced apart in frequency and receiving means responsive to received echoes of said pulsed energy reflected from a target, the combination comprising a source of a spacing frequency at least as high as the reciprocal of the pulsewidth of said pulsed energy and representing a preselected intermediate frequency;

single side band modulation means coupled to said source and providing a single side band signal;

bandpass limited means responsive to said side band signal for providing a feedback signal;

signal combining means interposed at said input of said single side band modulation means for combining said feedback signal with the output of said source and for extracting said feedback signal for energy transmission purposes, said transmitting means having an input responsive to said extracted signal;

coherent intermediate frequency receiver means including phase sensitive detection means responsive to said spacing frequency and to the beat frequencies between said received echoes for providing a coherently detected receiver signal, and doppler processing means responsive to said coherently detected receiver signal for providing an output indicative of said detected target.

* * * * *